INVENTORS.
SHINGO OOUE
HIROYUKI UEDA
MASAKAZU HASHIUE

United States Patent Office 3,498,705
Patented Mar. 3, 1970

3,498,705
PHOTOGRAPHIC PICTURE IMAGE PROJECTING METHOD AND DEVICE CAPABLE OF CONTRAST VARIATION INCLUDING REVERSAL
Shingo Ooue, Hiroyuki Ueda, and Masakazu Hashiue, Saitama, Japan, assignors to Fuji Shashin Film Kabushiki Kaisha, Kanagawa, Japan
Filed July 5, 1967, Ser. No. 651,228
Claims priority, application Japan, July 5, 1966, 41/43,773
Int. Cl. G03b 21/28
U.S. Cl. 353—20                                    2 Claims

ABSTRACT OF THE DISCLOSURE

A photographic picture image projecting method and apparatus utilizing linearly polarized lights is capable of transmitting a picture image of varying contrast. A rotatable analyzer arranged in the projection optical system is capable of varying the ratio of transmitted light to reflected light. The resultant image can vary in contrast from a negative to a positive image.

BACKGROUND OF THE INVENTION

Previous to this invention, there have been available a number of apparatus or devices, such as a variable contrast enlarger using a flying spot tube, a printer or inversion viewer utilizing a television system, a printer or inversion viewer based on the principle of the quenching phenomenon of fluorescent materials, and the like. These apparatus or devices above mentioned are, however, of complicated construction as well as expensive, and unfit for practical use as an enlarger because of low brightness of image and reduced sharpness of image, etc.

SUMMARY OF THE INVENTION

The present invention relates to a photographic picture image projecting method and a device for the same which can vary the contrast of the picture image over a wide range up to the reversal.

In a case where a photographic image of a negative film is to be printed onto a photographic printing paper, a cinematographic positive film, etc., where a positive film is subjected to printing in order to make a duplicating negative film, or where a picture on a film for a slide or movie is projected on a screen, it has frequently been desired to vary the contrast of a picture image to obtain proper tone reproduction or a photograph or image of better tone or appearance over a specific range of density. In fact, there may generally be produced a picture image exhibiting an excessively high contrast with a development time lengthened too long. Or, on the contrary, there may be produced a picture image possessing a contrast too low with a period of development time excessively shortened. There will be many obvious beneficial results in the art of automatic printing using a photographic printing paper, printing employing a movie film printer, etc., with easy manufacture of a photographic picture image whose contrast can simply be varied by virtue of a variable contrast printer of simple construction and being capable of yielding an image of high brightness, because it is impossible to change, in accordance with the contrast of the picture image, one photographic printing paper with the other with respect to the contrast, when an automatic printer using a roll paper is employed. Therefore, the image quality of a picture image resulting from automatic printing will be improved to a great extent, if the contrast of a picture image can optionally be varied by means of an optical system of the printer. Further, it is so in the case of printing a positive film for movies.

DETAILED DESCRIPTION OF THE INVENTION

Figure 1:
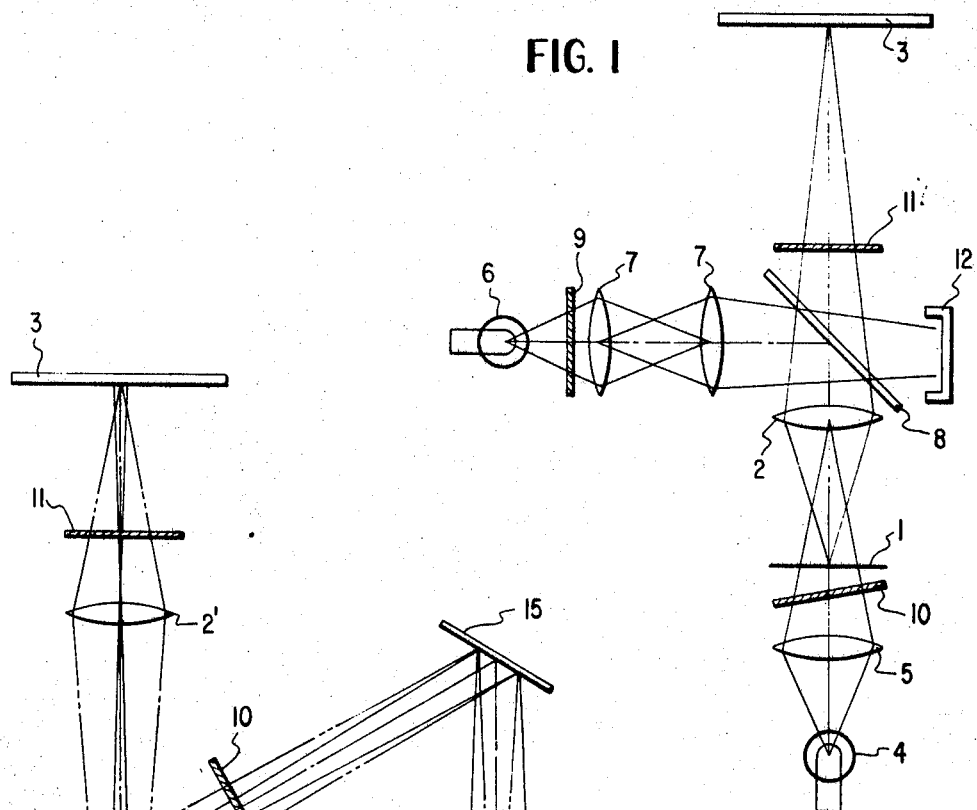
FIGS. 1 and 2 illustrate embodiments in accordance with this invention.

The present invention is concerned with a projecting method and device therefor which varies the contrast of the picture image of photographic materials having a picture image exhibiting high reflectance at a portion of high density, utilizing for image formation both transmitted light and reflected light from the picture image on said photographic materials. The present invention is characterized by the fact that said photographic materials and the projecting device can easily be manufactured and put to practical use with the result of formation of a picture image having very high brightness. In accordance with this invention, it is also possible with this projecting device to carry out a positive to positive photographic system without applying a reversal developing process to the photographic materials, for the projecting device in accordance with this invention can project a negative image as a positive image and vice versa as well as vary the contrast thereof. In addition to this, the projecting device in accordance with this invention may favorably be used as an inversion viewer, slide or movie projector.

More specifically, it is essential for this invention to use photographic materials manufactured by vacuum evaporating silver halide onto a substrate (vacuum evaporated photographic materials) or photographic materials such as silver alginate photographic materials which has a photographic image exhibiting high reflectance at a portion of high transmission density. The conventional photographic materials using gelatin as a binder reflect little light at the image portion, so that even if they are used for a device in accordance with this invention, the variable range of the contrast of the image is so small that the photographic materials cannot be put to practical use. We have found that the photographic materials such as vacuum evaporated photographic materials or silver alginate photographic materials which have photographic images exhibiting a metallic gloss having a higher reflectance in the character of a mirror surface at one portion having a higher transmission density than at another portion having a lower transmission density. Utilizing this fact, it may be concluded that a positive image can be produced by giving reflection illumination to such a picture image as yields a corresponding negative image upon being lightened with transmission illumination. Moreover, we have found that a picture image can be varied with respect to the contrast or reversed, if the picture image is lightened simultaneously with both transmission and reflection illuminations, and then the intensity of the former is changed relative to that of the latter, after the completion of each of image formations.

Now the present invention is described referring to the drawing as follows:

FIG. 1 shows a plan view of one embodiment in accordance with this invention. There is shown an optical system for projecting a picture image 1 onto the surface of a photosensitive material for printing or a screen 3 through a projection lens 2. The picture image 1 is lightened with transmission illuminations from a light source 4 for transmission illuminating through a transmission illumination condenser lens 5 on the one hand, and simultaeously lightened with reflection illumination from a light source 6 for reflection illuminating through a reflection illumination system comprising condenser lenses 7, 7 and a half silvered mirror 8 or alternatively, a member capable of partly reflecting light and allowing light to transmit partly.

In the present invention, polarizers 9 and 10 are arranged in the reflection illumination optical system and the transmission illumination optical system respectively, whereby the plane of polarity of the linearly polarized light of transmission illumination is crossed by the plane of polarity of the linearly polarized light of reflection illumination on said picture image 1. The best effect is obtained in the case where the two planes of polarity are crossed perpendicularly, but the effect of this invention is obtained whenever the planes of polarity are not crossed exactly perpendicularly. The angle between the two planes of polarity, however, should not be less than 20 degrees, for in the case of under 20 degrees it is hardly possible to put the device to a practical use. The description hereinafter refers to the case where the planes of polarity are crossed perpendicularly. An analyzer 11 is disposed between said screen 3 and said half silvered mirror 8. The ratio of illumination levels of transmitted light to reflected light from the picture image 1 which is projected onto said screen 3 can be adjusted by rotating said analyzer 11 around the optical axis thereof and varying the azimuth thereof. A light trap 12 is arranged in the optical system of the projecting device in accordance with this invention to absorb completely the transmitted light through said half silvered mirror among the reflection illumination lights. When the plane of polarity of the analyzer 11 coincides with that of the polarizer 10 of transmission illumination, the picture image 1 is projected onto said screen 3 only with transmitted light. This is because the plane of polarity of the reflected light is crossed perpendicularly by the plane of polarity of said analyzer so that reflected light from the picture image 1 cannot transmit through said analyzer 11 and reach to the screen 3. On the contrary, if the plane of polarity of the analyzer 11 coincides with that of polarizer 9 of reflection illumination, the plane of polarity of said analyzer 11 and the plane of polarity of the polarizer 10 are crossed perpendicular to each other, and only reflected light reaches said screen 3 from picture image 1.

As described above, the picture image having a metallic gloss which turns to a negative image when lightened with transmitted light turns to a positive image when lightened with reflected light, and turns to a picture image having various contrasts by varying the ratio of transmitted light to reflected light when lightened with both of them. By rotating said analyzer 11 around the optcial axis by the angle of less than 90 degrees, a picture image of optional contrast from negative to positive image can be obtained.

As an example, here is shown the relation of gamma (contrast) of the picture image projected on the screen 3 and the angle $\theta$ between the plane of polarity of analyzer 11 and the plane of polarity of polarizer 9 of reflection illumination.

| Difference of planes of polarity (degrees): | Gamma of projected image |
|---|---|
| 0 | −0.64 |
| 10 | −0.50 |
| 20 | −0.35 |
| 30 | −0.20 |
| 40 | −0.06 |
| 45 | 0.00 |
| 50 | +0.08 |
| 60 | +0.22 |
| 70 | +0.35 |
| 80 | +0.47 |
| 90 | +0.59 |

A gamma of negative characteristic is considered to be plus and a gamma of positive characteristic, minus.

When using a thin polarizing plate to make a linearly polarized light in the transmission illumination optical system, it is desired to incline said polarizing plate so that the plate makes an angle about from 60 to 85 degrees with the optical axis to prevent the reflected light from said polarizing plate by reflection illumination from passing through the aperture of the projection optical system.

It is also desired that reflection illumination lights entering said half silvered mirror 8 are as parallel as possible and the plane of polarization is parallel or perpendicular to the plane of incidence, whereby the inequality of brightness of the picture image on the screen 3 is reduced.

Figure 2:
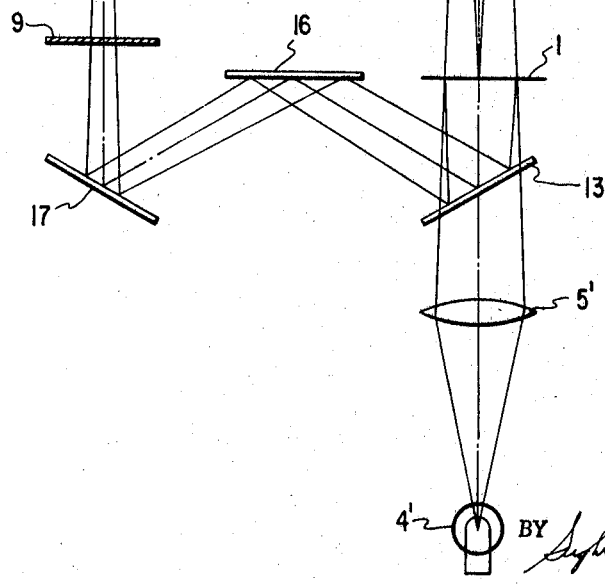

FIG. 2 shows another embodiment in accordance with this invention in which a light source 4′, projecting lenses 5′, 2′, half silvered mirrors 13, 14, mirrors 15, 16, 17, polarizers 9, 10, each having different plane of polarity from each other, and an analyzer 11 whose plane of polarity can be varied by rotation thereof are arranged. The emitted light from said light source 4′ transmits through said lens 5′ and is separated into a transmitted light and a reflected light with said picture image 1. The transmitted light and the reflected light are polarized respectively by said polarizer 10 and said polarizer 9 having a different plane of polarity, and after being composed by said half silvered mirror 14 they are projected onto said screen 3 by said projecting lens 2′ through said analyzer. As in the case of the embodiment described hereinbefore, by rotating the analyzer 11 to vary the plane of polarity thereof, a picture image is obtained on the screen 3 having a varying contrast including reversal.

The superior effects of this invention over the prior art in which the intensity of illuminations are adjusted independently of each other are as follows:

(1) When the transmitted light and the reflected light are varied in their intensity respectively to vary the contrast of the picture image 1 as in the projecting method and device of this kind of the prior art, the brightness of the projected image on the screen is also varied.

According to the method of invention, when a portion of the picture image where transmitted light and reflected light are equal is projected onto the screen 3, the projected portion of the picture image is not varied in the brightness thereof even if the contrast thereof is varied by the rotation of said analyzer 11. The reason of the fact described above is explained as follows with some formulae concerning the embodiment illustrated in FIG. 1:

The brightness of a portion of the projected image by transmitted light illumination $Bt$ is determined with the brightness on the picture image 1 by transmission illumination and transmission coefficient thereof, and the brightness of the same portion of said projected image by reflected light illumination $Br$ is determined with the brightness on the picture image 1 by reflection illumination and reflection coefficient thereof. The brightness of said portion of said projected image on the screen $Bs$ can thus be written as $$Bs = k(Bt \sin^2 \theta + Br \cos^2 \theta) \qquad (1)$$

where $k$ is a constant of the optical system for projection and $\theta$ is an angle between the plane of polarity of analyzer 11 and the plane of polarity of polarizer 9. When the transmitted light and the reflected light are equal in the brightness thereof at a portion of the picture image, $bt$ equals $Br$ for the portion. Thus the Formula 1 can be written as $$Bs = kBt(\sin^2 \theta + \cos^2 \theta) = kBt \qquad (2)$$

so that $Bt$ is independent of the value of $\theta$, that is, the brightness on the screen is not varied even if the contrast is varied.

This effect is particularly advantageous in the case that this invention is applied to a photographic enlarger, automatic photographic printer and the like. Take portrait photography for instance, the density of the face should be constant on the printing paper whatever the density of the negative film. Then, if the brightness $Br$ by the reflected light and the brightness $Bt$ by the transmitted light of the portion of the face on the picture image are chosen equal to each other by varying the light intensity of the light source, the brightness of the portion of the face on the image projected on the screen does not vary even if the contrast of the image is varied by rotating the analyzer. Accordingly, when printing on the photographic paper placed at the same position of said screen, the print having a constant density of the face can be obtained for various contrast thereof, unless the exposing time is not adjusted.

In a general photographic system, photographic printing paper of different tone is used and chosen properly for the tone of the negative image to get the picture image of the desired contrast. By this photographic system, however, there is an inconvenience in that the exposing time should be varied with the tone of the photographic paper, because of the difference of the sensitivity thereof.

(2) When the light intensity is varied by varying the electric voltage supplied to the incandescent lamp used for illumination to adjust the ratio of illumination levels of transmission illumination to reflection illumination as in the prior art, the color of light of said two illuminations becomes different from each other and color of the portions of the picture image becomes non-uniform. On the contrary, in the present invention there is an effect that the color of light does not vary even when the light intensity is varied for variation of the contrast.

(3) Moreover, in the case of the embodiment illustrated in FIG. 1, there is another effect described as follows:

When only reflection illumination is lightened onto the picture image 1, there is some illumination transmitting the picture image from front to back and reflected by the optical system for transmission illumination or by the condenser mirror behind the light source 4, and this results in the same effect as when the transmission illumination is increased somewhat, by the projecting optical system of prior art. And for this reason, it was very difficult to project the picture image only by the reflected light, when there was a transmitting optical system behind the picture image.

According to the embodiment illustrated in FIG. 1, if the plane of polarity of polarizer 10 for transmission illumination is perpendicular to the plane of polarity of polarizer 9 for reflection illumination, the light transmitting the picture image from front to back is intercepted with polarizer 10 and no light is reflected with transmission illumination optical system. By the projecting device in accordance with this invention, it became possible for the first time to project the picture image with only reflected light even when there is a transmission illumination optical system.

The present invention can be applied to a slide projector, a movie projector, a photographic enlarger, a photographic printer, a cinematographic optical printer, an inversion viewer and the like.

What is claimed is:

1. A photographic picture image projecting method which varies the contrast of said picture image over a wide range up to the reversal comprising the step of putting a photographic material having a picture image exhibiting high reflectance at a portion of high density in a transmission illumination optical system, illuminating said picture image with a reflection illumination optical system, putting a polarizer respectively in said transmission illumination optical system and said reflection illumination optical system, said polarizers each having a plane of polarity different from each other, putting an analyzer rotatable around the optical axis thereof in said transmission illumination optical system where composed with said reflection illumination optical system, and rotating said analyzer around the optical axis thereof for varying the contrast of the projected image on a screen by varying the ratio of illumination levels of transmitted light to reflected light.

2. A photographic picture image projecting device which varies the contrast of the projected image of said picture image over a wide range up to the reversal, in which the picture image exhibits high reflectance at a portion of high photographic density, comprising, a transmission illumination optical system for projecting said picture image onto a screen, said transmission illumination optical system having a polarizer between said picture image and the light source thereof, a reflection illumination optical system for lightening said picture image from forward, said reflection illumination optical system having a polarizer between said picture image and the light source thereof and out of said transmission illumination optical system, and an analyzer rotatable around the optical axis thereof positioned between said screen and said picture image, said polarizers each having a plane of polarity different from each other.

References Cited
UNITED STATES PATENTS

| 2,641,963 | 6/1953 | Carter | 353—20 |
| 2,783,678 | 3/1957 | Andreas et al. | 355—71 X |

NORTON ANSHER, Primary Examiner

R. A. WINTERCORN, Assistant Examiner

U.S. Cl. X.R.

353—121; 355—67, 71